United States Patent [19]

Zibilich, Jr. et al.

[11] Patent Number: 5,197,716
[45] Date of Patent: Mar. 30, 1993

[54] SEISMIC CABLE DEPLOYMENT APPARATUS

[75] Inventors: Anthony M. Zibilich, Jr.; Garron J. Chaisson, both of Mandeville, La.; Mancel C. Beam, Sante Fe, Tex.

[73] Assignee: Shell Offshore Inc., Houston, Tex.

[21] Appl. No.: 688,399

[22] Filed: Apr. 22, 1991

[51] Int. Cl.⁵ .................................. B63B 35/03
[52] U.S. Cl. .................... 254/134.3 SC; 405/166; 405/168.4; 254/134.3 R
[58] Field of Search ............ 254/134.3 SC, 134.3 R, 254/134.4; 405/168.4, 168.3, 168.1, 166

[56] References Cited

U.S. PATENT DOCUMENTS

| | | | |
|---|---|---|---|
| 3,216,636 | 11/1965 | Kothe | 226/1 |
| 3,844,129 | 10/1974 | Finlay | 61/72.3 |
| 4,312,496 | 1/1982 | Norminton | 254/302 |
| 4,313,392 | 2/1982 | Guenther et al. | 114/244 |
| 4,433,938 | 2/1984 | Boom | 405/168.4 |
| 4,529,172 | 7/1985 | Comte | 254/134.3 |
| 4,596,492 | 6/1986 | Monti et al. | 405/171 |
| 4,828,223 | 5/1989 | Russell et al. | 254/265 |
| 4,830,300 | 5/1989 | Taylor et al. | 242/54 |
| 4,917,540 | 4/1990 | Recalde | 254/134.3 SC |

Primary Examiner—Bruce M. Kisliuk
Assistant Examiner—Eileen Morgan
Attorney, Agent, or Firm—Fred S. Reynolds

[57] ABSTRACT

A marine cable deployment apparatus for deploying marine seismic cable from a ship which reduces tension force on the cable at the cable storage reel when the cable storage reel (drum) is winding out the cable. Marine cable is subject to a longitudinal tension force which can damage the marine cable when it is deployed from a storage reel. The apparatus of this application reduces the longitudinal tension force on a portion of marine cable so that the portion of cable can be deployed from a storage reel. The apparatus includes a collar attached to the marine cable and a cable deployment tool which is placed around the marine cable. The cable deployment tool has dogs which engage the collar and a locking ring which holds the dogs in place. The cable is deployed with the deployment tool accompanying the deployed cable. A line between the deployment tool and the ship provides an opposing force to the longitudinal tension force on the cable trailing behind the collar. After the portion of cable is deployed the opposing force on the cable retrieval tool is reduced to a point that the deployed portion of cable assumes the longitudinal tension force on the cable trailing behind the collar. The tension on the line is released. The locking ring slides back on the deployment tool releasing the dogs from the collar. The deployment tool is pulled back along the cable to the ship to attach to the next portion of cable to be deployed.

28 Claims, 5 Drawing Sheets

SEISMIC CABLE DEPLOYMENT APPARATUS

FIELD OF THE INVENTION

The present invention relates generally to marine seismic cable and more particularly, to an apparatus or method which reduces tension on marine seismic cable during deployment of the cable from a storage reel (drum) to the water.

BACKGROUND OF THE INVENTION

Marine seismic exploration is generally conducted by towing a marine seismic streamer cable at a given depth through the ocean or other body of water. However, in some locations due to congestion on the surface or a requirement to detect shear waves, a marine seismic bottom cable is used.

The current practice in marine seismic data collection is to require marine seismic cable of a longer length than was required in the past. For streamer cable, this means a length which could exceed four miles and for bottom cable the length could be equally as long and with an operating depth in excess of 4000 feet. In addition, some seismic data collection techniques require a plurality of marine streamer cable being towed behind a ship at the same time.

A marine cable includes sections of marine cable, usually about 300 feet long, connected together by couplers. In some marine cable designs, each 600 feet, an instrumentation package is connected between sections of marine cable. Each section and each instrumentation package, if it is to be interchangeable, must be able to absorb the cumulative drag force upon the cable when towed in water and if a bottom cable, it must also be able to absorb the weight of the cable between the ship and the bottom.

A marine cable section can absorb this tension force by including longitudinally within the cable section stress members which connect to the couplers to transfer the drag and weight forces on that cable section to the next section of marine cable until finally at the connection to the ship, the drag force on the cable is received as a cumulative tension force on the cable.

In the case of the instrumentation package connected between two couplers, the drag and weight forces are transferred from the trailing coupler, which is linked to stress members of the trailing section of seismic cable, through the body of the instrumentation package to the connecting coupler of the next section of marine cable.

Longer cable or cable which can operate at greater depths place new demands on marine cable operations. The additional length increases the time on station because additional time is needed to deploy the cable and in some cases, currently available methods to deploy cable may not be adequate to prevent damage to the longer cable.

In the present methods for marine cable deployment the speed at which cable can be deployed into the water without damaging the cable is a limiting factor. Marine cable which meets the new requirements for additional length or greater operating depth place even more sever limitations on the speed at which the marine cable can be deployed.

The problem is the tension on the cable as the cable is wound off of the cable storage reel. This can be explained using the deployment of a streamer cable. A streamer cable, especially if it is being used with other equally long cables, is deployed during towing to keep the cables separated. However, the towing does exert a drag force on the cable which is proportional to the length of the cable. This force is seen at the cable reel as a longitudinal tension force on the cable.

Streamer cable sections can be as much as 4 inches in diameter. They are usually made with an outer layer of polyurethane tube which is supported by spacers and the tube is filled with oil or some other nonconducting liquid to provide buoyancy to the marine cable.

The streamer cable is fragile and flexible at the surface. Current designs of marine cable can usually withstand the longitudinal tension force on the cable at the point on the cable storage reel where the cable is winding off of the reel. However, the longitudinal tension force affects more than just this one location on the cable storage reel. As the cable is wound off of the cable reel, the longitudinal tension force is also converted to a transverse force at the cable reel which squeezes the cable. The transverse force which squeezes the cable also migrates down within the layers of the cable on the storage reel because the longitudinal tension force on the cable acts to tighten the cable on the reel. This is due to the movement of the cable storage reel. With the storage reel turning, as a result of gravity, the layers of cable constantly shift position relative to each other. This reduces the friction between layers of cable which in turn allows slippage of the cable, i.e. the longitudinal tension force tightens up the cable on the storage reel. As the transverse squeezing force penetrates deeper within the layers of cable due to slippage, the transverse force is cumulative on the lower layers of cable because the layers of cable above are also exerting this squeezing force on the underlying cable. Since the lower layers of cable on the reel are subjected to an increasingly greater force which squeezes across the diameter of the cable as the cable tightens on the cable storage reel during deployment operations, the cable could rupture, spilling oil or the cable could collapse, damaging the internal components of the cable.

A bottom cable has a similar construction as the streamer cable and undergoes the same process when deployed from a storage reel, the major difference is that a large component of the tension on the bottom cable at the cable storage reel is the weight of the cable between the ship and the bottom. This weight can be substantial especially when the cable is laid at depths in excess of 4000 feet.

The longitudinal tension force on the cable at the storage reel could be reduced by: reducing the towing speed when a streamer cable is deployed; increasing the rate at which the cable storage reel deploys cable; or using sheaves.

Reducing the towing speed is one method now used to deploy streamer cable. However, the longer the cable the more drag exerted on the cable. Consequently, to reduce the tension to an acceptable level at the cable reel, the longer cable must have an even slower towing speed. This can lead to tangling streamer cables if multiple cables are towed.

Increasing the speed on the deployment of the cable from the cable storage reel is another method to compensate for longer cable. This technique could be used with both bottom cable and with streamer cable. However, it is not practical to increase the speed of the storage reel to deploy cable at the same speed as the ship or at the same rate a bottom cable will sink in water for the following reasons: (1) A cable storage reel can be 12 feet or more in diameter and there is a limit on how quickly the cable storage reel can rotate safely in a marine environment which is subject to the wave motion on the ship. (2) A tension force is still necessary on the deployed cable in towing operations to guide the cable to prevent tangling and in bottom cable operations to maintain a straight line over the area to be explored. (3) Since the longitudinal tension is necessary to deploy the cable, increasing the speed of the cable storage reel could reduce the longitudinal tension force at the cable storage reel. However, it is also possible that this will also substantially reduce the friction between layers of cable resulting in less tension force needed to tighten the layers of cable to produce the migrating squeezing force on the lower levels of cable on the storage reel. Consequently, the problem will remain, the transverse squeezing force could build up to a point to damage the cable.

As discussed, since a longitudinal tension is necessary for deployment of the cable, the problem could be resolved if it were possible to isolate the cable storage reel from the longitudinal tension force or at least, substantially reduce the longitudinal tension force at the cable storage reel. Sheaves have traditionally been used to perform this function for cable. However, sheaves have proven not to be effective for reducing tension forces on a marine cable at the cable reel because: (1) The diameter of the marine cable can vary along its length due to the various types of instrumentation packages which can be placed on the cable, (2) connecting couplers which link streamer cable sections and instrumentation packages together to form a streamer cable may have a diameter greater than the streamer cable, and (3) in order for sheaves to reduce the tension applied at the cable reel, it must exert a force transverse to the length of the streamer cable. However, current designs of marine cable can not withstand a transverse force on the outer surface because the outer surface is flexible. The outer surface is supported by spacers and a fluid within the cable. Therefore, sheaves can not exert enough force at a single point on the cable to counter balance the longitudinal tension force upon a marine cable at the cable reel.

One approach to solving this problem is found in U.S. Pat. No. 4,828,223, Cable Handling Apparatus, issued on May 9, 1989 to Russel and Gjestrum. The Cable Handling Apparatus overcomes many of the above mentioned disadvantages of using sheaves by using a series of sheaves which encounter the marine cable at several different locations along its length. The invention can also accommodate varying diameters of the cable with each sheaves in turn absorbing some of the tension caused by the drag force on the cable. However, a device of this nature has a complex pneumatic control system. In addition, it is large and bulky, thereby taking up considerable space aboard a ship.

A simpler approach is desired to reduce the longitudinal tension force at the cable storage reel or to isolate the longitudinal tension force from the cable storage reel during cable deployment operations so that cable deployment can be performed quicker and within the tension levels at the storage reel which will prevent damage to the marine cable.

SUMMARY OF THE PREFERRED EMBODIMENT

It is a purpose of the present invention to provide a marine cable deployment apparatus which will allow the deployment of longer marine cable at towing speeds or depths which were not possible in the past due to limitations that a cable could withstand of the longitudinal tension force at the storage reel during deployment.

Another purpose is to provide a method to reduce the longitudinal tension force on the marine cable as it is wound off of a cable reel to prevent damage to the marine cable by reducing the longitudinal tension on a portion of the marine cable from the cumulative longitudinal tension force on the cable so that the portion of cable with reduced tension can be deployed from the cable storage reel.

An additional purpose is to provide an apparatus which will reduce the tension force on marine cable at the storage reel during deployment operations which can operate with standard shipboard equipment and take up little deck area on ship when in operation or storage.

In accordance with the purposes of the present invention, there is provided a marine cable deployment apparatus. In the preferred embodiment the apparatus includes a collar and a cable deployment tool operating with standard shipboard equipment for the deployment of marine cable. The standard shipboard equipment used in conjunction with the preferred embodiment of the present application includes a marine cable storage reel (drum) which is connected to the marine cable and a line hoist which is connected to the cable deployment tool.

Collars are attached to a marine cable at selected intervals, usually about each 600 feet of marine cable. The collar works in conjunction with the cable deployment tool as a means for gripping the cable. A collar is placed at a location on the cable which can absorb the longitudinal tension loads on the cable without damaging the cable.

The cable deployment tool, which in the preferred embodiment includes a sleeve, is placed around the marine cable adjacent to a collar. The sleeve has attached, by the use of pivot points, dogs which have an engagement surface to grab the collar. A line is attached to the deployment tool by running the line through a line guide at the forward end of the sleeve and attaching the line to a locking ring which surrounds the sleeve and holds the dogs in place. The other end of the line is attached to the ship, preferably, a line hoist. The line is then placed under tension so that the cable deployment tool grabs the collar. The tension on the line through the deployment tool results in an opposing force at the collar to the longitudinal tension force on the cable trailing behind the collar.

In the preferred method to deploy cable using the cable deployment tool, enough tension is applied by the line to counteract the entire longitudinal tension force on the cable trailing behind the collar. This isolates a portion of cable between the cable storage reel and the collar from the longitudinal tension force on the cable.

The cable storage reel is then actuated to deploy cable into the water. While the cable is being deployed, the line lets out the deployment tool to allow the isolated portion of deployed cable to trail behind the ship forming a slack length of cable.

After a selected length of cable is deployed, typically around 600 feet, another collar on the cable is available at the cable storage reel for connection to the deployment tool to deploy the next portion of cable. The cable storage reel is then stopped. The line continues to let the deployment tool out until the slack length of cable no longer has slack and the deployed portion of cable assumes the longitudinal tension load of the cable trailing behind the collar.

In an alternate method of deployment of cable, the opposing force applied to the collar is less than the longitudinal tension force on the cable trailing behind the collar. However, a portion of cable between the collar and the cable storage reel does have a reduced longitudinal tension force applied to that section. The cable deployment tool is let out at the same rate as the section of cable is deployed to maintain a constant tension on the collar. Tension gauges connected to the line and the cable storage reel could be used to coordinate the deployment to ensure that excessive longitudinal tension is not placed on the storage reel. This alternate method may be a more appropriate method for deployment of bottom cable where it is important to maintain a straight line which could be compromised by the deployment of a slack length of cable.

In both the preferred and alternate method of deployment, after the deployed portion of cable is fully extended, the tension of the locking ring is then removed by letting the line go slack. The locking ring which held the dogs in place then slides to the rear of the deployment tool due to the resistance of the locking ring to water flow. This releases the dogs from engaging the collar. The dogs then rotate about the pivot point away from the collar and rest against the outside surface of the locking ring.

The line is then pulled back toward the ship. This pulls the locking ring forward along the sleeve of the deployment tool. The forward motion of the locking ring causes the dogs to rotate forward to a retrieval position. Each dog has a retrieval locking tooth which engages the locking ring as the ring moves forward which stops the dog from further rotation, thus preventing the dogs from swinging back and forth in the water where they could possible damage the cable within the deployment tool. When the locking ring locks the dogs into their retrieval position, the ring can no long move forward along the sleeve; therefore the pulling of the line toward the ship now pulls the cable deployment tool back to the ship along the cable for connection to the next portion of cable to be deployed.

The preferred embodiment of the present invention also provides a friction reduction means to reduce friction between the sleeve and the cable when the deployment tool is being pulled back to the ship. In addition, paddles are incorporated in the design of the dogs and the locking ring to resist water flow for the preferred embodiment so that the motion of the deployment tool in the water will provide the force to push the locking ring back and to rotate the dogs away from the collar when the deployment tool is released from gripping the cable. Also guide notches are provided on the holding ring which align with guide rails on the sleeve to prevent the rotation of the holding ring on the sleeve so that the paddles on the holding ring will not block the rotation of the dogs when they are released from the collar.

These and other objects and advantages of the present invention will no doubt become apparent to those skilled in the art after having read the following detailed description of the invention which are contained herein and illustrated by the various drawing figures.

The invention encompasses the heretofore preferred embodiment as well as other embodiments as are described hereinafter and as will be apparent to those of skill in the art.

DETAILED DESCRIPTION OF THE PREFERRED EMBODIMENT

Figure 1:
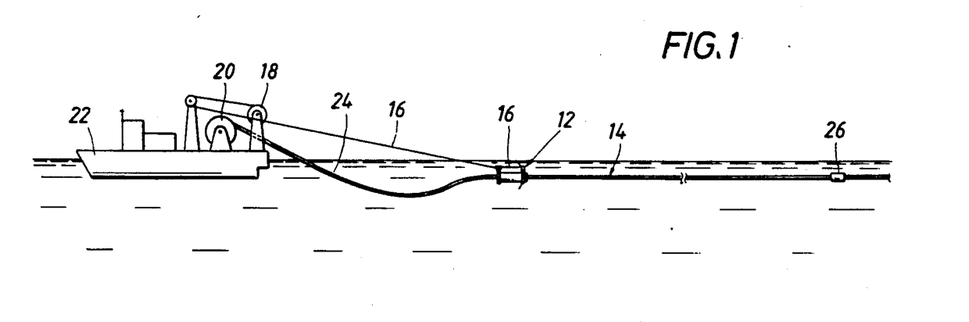
FIG. 1 is a schematic pictorial of a ship deploying a marine streamer cable with a preferred embodiment of the present invention on the marine cable.

Referring to FIG. 1, a preferred embodiment of the present invention is illustrated as it would be used in the preferred method to deploy cable by isolating a portion of marine streamer cable from a longitudinal tension force on the marine cable so that the isolated portion of marine cable may be deployed into water without subjecting the cable on the cable storage reel to the longitudinal tension force as the cable is being deployed.

In FIG. 1, a cable deployment tool 12 is shown encircling marine cable 14 with a line 16 connected between the cable deployment tool 12 and a line hoist 18. A cable storage reel 20 (drum) is shown connected to one end of marine cable 14 and the cable storage reel 20 is located along with line hoist 18 aboard a ship 22 towing marine cable 14. Line 16 is shown initially contacting deployment tool 12 to what will be referred to in this application as the forward end of cable deployment tool 12, that is, the end of the cable deployment tool facing the cable storage reel 20.

FIG. 1 also shows a portion of marine cable 14 which is upstream of cable deployment tool 12 as a slack length of cable 24. Also illustrated is a collar 26 attached to marine cable 14 shown located downstream of cable deployment tool 12.

The collar 26 is attached at selected intervals, usually around 600 feet, to the marine cable 14. The purpose of the collar, when working in conjunction with the cable deployment tool 12, (not shown in FIG. 1, to be shown hereinafter) is to provide a means for gripping the cable.

The collar 26 must be located at a point on the marine cable where, when working in conjunction with the deployment tool 12, it can absorb the tension on the trailing portion of marine cable without damaging the cable. Preferably, the collar is shaped to rise above the point of the cable that it is attached to and the engagement surface of the collar is also shaped to be compatible to the means for engaging the collar on the cable deployment tool 12. Since a marine cable can be several miles long, it is necessary to attach several collars to the cable in order to deploy the entire marine cable 14.

Marine cable 14 is usually made up of sections of cable and instrumentation packages which are joined together to form the marine cable 14. The joining is usually done by a connecting coupler and since the connecting coupler is designed to absorb the tension force on the trailing sections of cable and transfer this tension to the forward sections of cable, the coupler is an ideal location to attach a collar to the marine cable.

Instrumentation packages also offer a good location to attach the collar to the cable because the body of the instrumentation package is also used to transfer tension forces along the marine cable. In addition, an instrumentation package does not bend, therefore it offers a solid support for the collar. Also, the exterior housing of the instrumentation package can be designed to provide the function of a collar.

FIG. 1 is a illustration of the preferred method of deployment of a marine streamer cable which is being towed. The principle of operation of the present invention to be discussed hereinafter would be the same when used for the deployment of bottom cable.

In accordance with FIG. 1, the preferred embodiment of this present application operates in the following manner to deploy a cable using the preferred method for deployment of marine cable. When a ship 22 is deploying marine cable, the cable trailing behind the ship exerts a longitudinal tension force upon the marine cable at the cable storage reel. The cable deployment tool 12 is placed around marine cable 14 adjacent to a collar attached to the cable (not shown in FIG. 1). Line 16 is attached to a line hoist 18 and the forward end of the deployment tool 12. The deployment tool 12 is placed under tension by line 16 which causes the deployment tool 12 to grip the cable at the collar (not shown in FIG. 1). This results in an opposing force to the longitudinal tension force on the marine cable at the collar. In the preferred method the opposing force is as large as the longitudinal tension force on the cable trailing behind the collar thus the longitudinal tension force is transferred from the cable between the storage reel and the collar to the deployment tool 12. The marine cable between the deployment tool 12 and the cable storage reel is now isolated from the longitudinal tension force on the cable trailing behind the collar. The cable storage reel is then engaged to deploy an isolated portion of cable. As the isolated portion of cable is deployed from the cable storage reel 20, line 16 is let out while maintaining tension on the deployment tool 12 to allow the isolated portion of cable to trail behind the ship 22. Since, tension is maintained on the deployment tool 12 a slack portion of cable 24 is formed. After about 600 feet of cable is deployed in this manner, another collar attached to the marine cable will be in a position for the deployment tool 12 to grip. The cable storage reel 20 will be stopped and line 16 will continue to be let out until the slack portion of cable 24 assumes the longitudinal tension force on the cable. The cable deployment tool 12 will then be released from the collar and pulled back to the ship to attach to the next collar.

In an alternate method to deploy cable, the opposing force placed on the collar by the cable deployment tool is less than the longitudinal tension force on the cable at the collar, but between the collar and the cable storage reel the longitudinal tension force on this portion the cable is reduced by an amount equivalent to the opposing force placed by the cable deployment tool on the collar. The cable deployment tool is let out at the same rate the portion of cable is deployed so that a substantially constant opposing tension force can be maintained at the collar. Tension gauges mounted on the cable storage reel and the line could be used to coordinated this method to ensure that the longitudinal tension force on the cable at the cable storage reel does not exceed safe levels. This alternate method may be more appropriate than the preferred method for deploying bottom cable where it is important to maintain a straight line which could be compromised by deploying a slack length of deployed cable.

The cable storage reel is stopped when the cable deployment tool is released from the cable and during the period when the cable deployment tool is being repositioned. When using the preferred method of deployment of marine cable, the longitudinal tension force on the cable reel during repositioning of the deployment tool 12 should not be great enough to damage the cable because the cable is designed to withstand this longitudinal tension. It is the cumulative transverse tension force which damages the cable. With the reel stationary, although the longitudinal tension force does increase at the cable reel during repositioning, the lateral squeezing force will not be able to migrate within the layers of cable deep enough to built up enough of a cumulative transverse tension force to damage the cable. This is because: (1) The cable reel is subjected to longitudinal tension force for only a limited period of time, i.e. the length of time needed to reposition the deployment tool 12. (2) During this period the cable storage reel is not rotating, the friction between the layers of cable is larger when the reel is not turning; therefore there will be more resistance to the tightening of the cable on the reel due to the effect of the longitudinal force. This will hinder the transverse squeezing force from migrating lower into the layers of cable. (3) And, when the deployment tool 12 is used to deploy the next portion of cable, even if the lateral squeezing force had migrated below the top layers of cable, these layers will be deployed in the next deployment cycle. Consequently, the lateral squeezing force does not have the opportunity to build up over time to the extent that it could damage the cable.

The before mentioned discussion also applies to the alternate method of deployment of cable, provided the opposing tension placed upon the collar by the cable deployment tool is large enough to prevent cable slippage on the cable storage reel. To prevent slippage, i.e. tightening of the cable on the cable reel, the longitudinal tension force on the cable at the cable reel should be less than the friction force between the layers of cable when the cable reel is turning. If the longitudinal tension force is not enough to cause cable slippage on the cable storage reel, the transverse squeezing force will not be able to migrate within the layers of cable so that the cumulative effects of transverse squeezing force could damage the cable. However, even if slippage can not be avoided by use of the alternate method, the alternate method will still be of benefit over current deployment techniques because any opposing force at the collar will reduce the longitudinal tension force at the cable storage reel which will reduce the slippage; consequently reducing the cumulative effect of the migrating transverse squeezing force.

Figure 2:
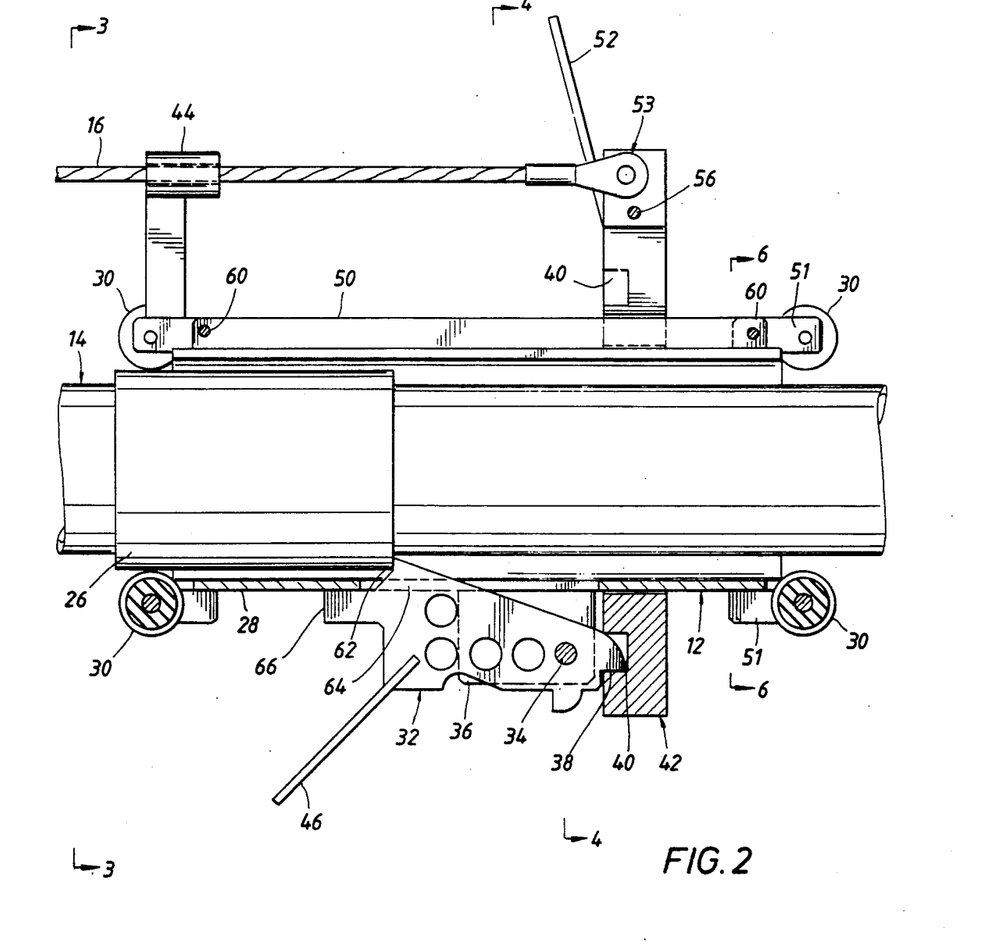
FIG. 2 is an oblique partial cut away view of the preferred embodiment of the present invention engaging a collar taken at section 2—2 of FIG. 3.

Reference is now made to FIG. 2 which is an oblique partial cut away view of the deployment tool 12 shown in FIG. 1. FIG. 2 shows the deployment tool 12 gripping a collar 26.

The deployment tool 12 is shown to include a sleeve 28 which encircles cable 14. The length of the sleeve acts to prevent the deployment tool from kinking the cable when a tension is applied to the deployment tool to provide an opposing tension force at the collar to the longitudinal tension force of the cable on the collar.

Attached to the sleeve at both ends is a friction reduction means to reduce the friction between the sleeve 28 and the cable 14 when the deployment tool 12 is pulled back along the cable to be connected to the next portion of cable to be deployed. Practitioners in the art could recognize that there are various methods which could be used to reduce friction such as coating the interior of the sleeve with a material which has a low coefficient of friction between the sleeve and the cable or shaping the interior surface to have a pattern of protrusions which has a low coefficient of friction. In the preferred embodiment rollers 30 are used for the friction reduction means.

Included in the cable deployment tool 12 is a collar engagement means which engages and holds collar 26 until released. In the preferred embodiment a dog 32, i.e. a holding device, is used to grip the collar 26. The dog 32 is mounted to sleeve 28 at a pivot point 34 located on extension 36 from sleeve 28. The dog 36 has a engagement locking tooth 38 which projects into a locking notch 40 on slidable locking ring 42 to hold dog 32 in place when engaged to collar 26.

Line 16 is shown passing through line guide 44 and attaching to locking ring 42.

Figure 3:
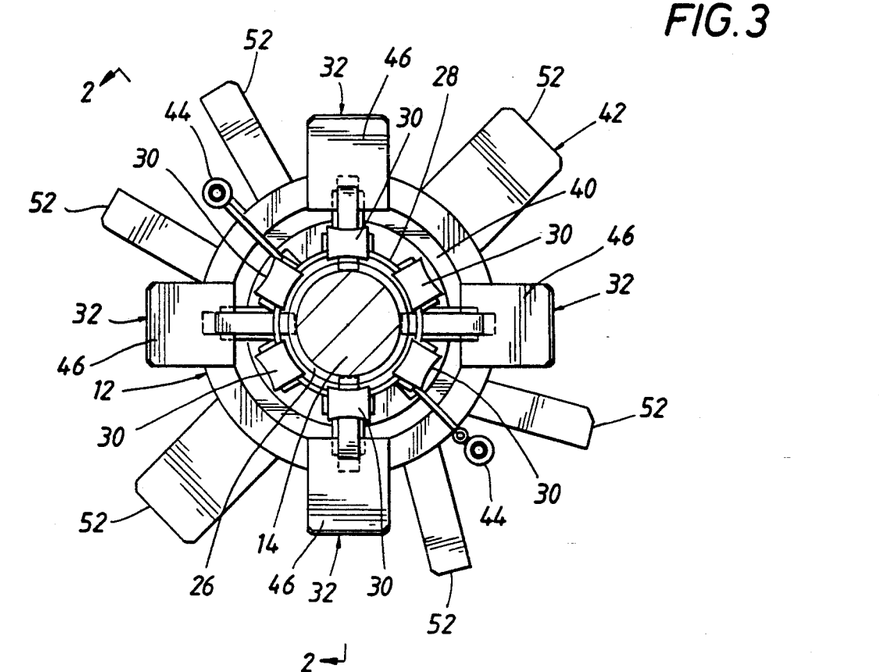
FIG. 3 is a top sectional view of the embodiment shown in FIG. 2 taken at section 3—3 looking down on the forward end toward the rear end of the preferred embodiment.

All of the before mentioned parts are located around the circumference of the deployment tool. FIG. 3 provides a sectional view taken at section 3—3 of FIG. 2 looking from the forward end of the deployment tool to the rear to show the relative location of some of the before mentioned parts.

In the preferred embodiment shown in FIG. 3, the sleeve 28 has a cylindrical shape. It may be apparent to those who practice the art that other body shapes are possible as long as the components which are attached to or interact with sleeve 28 are properly scaled to grab and release the collar.

At the forward end of FIG. 3 (the end nearest to the viewer) 6 rollers 30 are shown attached and located around the circumference of sleeve 28. The number of rollers 30 is not critical as long as there are enough to properly reduce friction between the sleeve 28 and the cable 14. Also shown are line guides 44 located on opposite sides of sleeve 28. The use of two line guides 44 allows the line to be split so that an opposing force can be applied to both sides of the slidable locking ring 42.

Behind rollers 30 are dogs 32. The dogs 32 are shown in an engaged position with the mating end (engagement surface) of the dogs shown in phantom lines behind collar 26. The dogs 32 are also shown to have a broad paddle 46 which offers resistance to water flow past the deployment tool 12.

Behind the dogs 32 on FIG. 3, locking ring 42 is shown. A better view of the locking ring 42 is provided in FIG. 4 which is a cross sectional view taken at section 4—4 of FIG. 2 looking toward the rear. The locking ring 42 encircles sleeve 28 but is not attached to it so that it can slide back and forth along a portion of sleeve 28. On opposite sides of the locking ring 42 are guide notches 48 cut into the locking ring which fit over guide rails 50 attached to sleeve 28 to prevent the locking ring from rotating about sleeve 28. Referring to FIG. 2, one guide rail 50 is shown extending along the length of sleeve 28, although the other guide rail 50 is not shown in the illustration it also extends the length of the sleeve. Returning to FIG. 4 the locking notch 40 is shown to be continuous around the locking ring in the preferred embodiment although it is possible in another embodiment since the locking ring 42 is prevented from rotation to only cut the locking notch in the vicinity of the engagement locking tooth on the dog.

Figure 4:
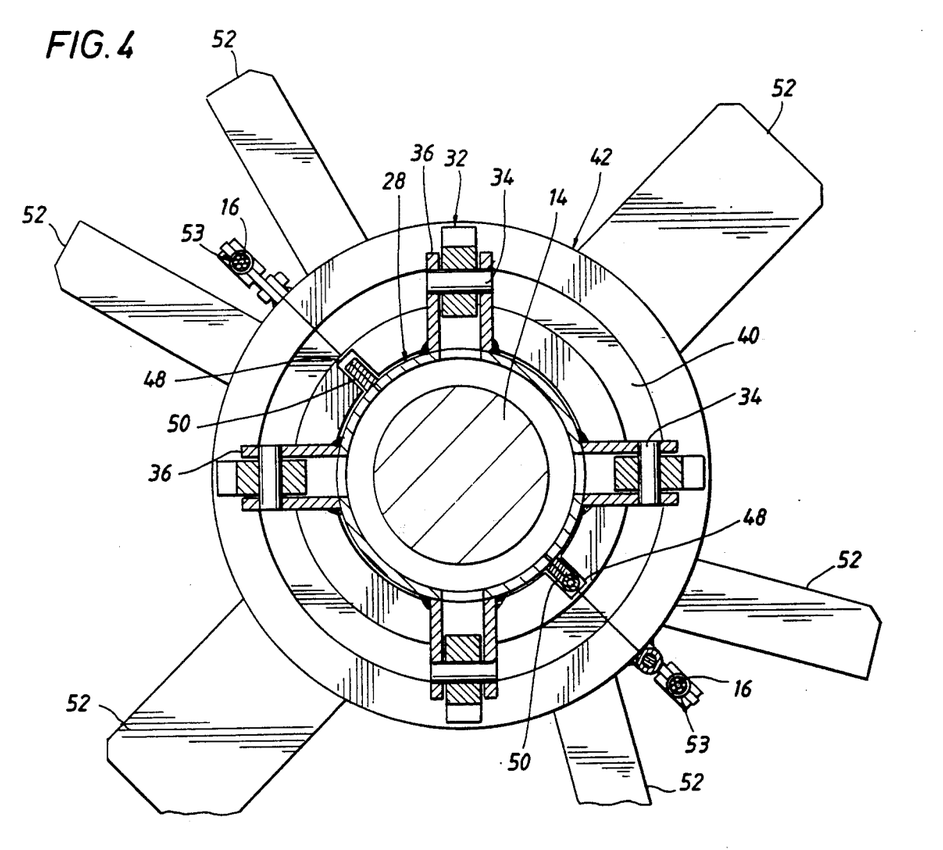
FIG. 4 is a cross sectional view of the embodiment shown in FIG. 2 taken at section 4—4 looking toward the rear end of the present invention.

FIG. 4 also show ring paddles (a first set of paddles) 52 on the locking ring which offer resistance to the flow of water past the deployment tool. Ring paddles 52 are aligned and seized to have a resistance to water flow when the dogs 32 are in an engaged position that is greater than the paddles (a second set of paddles) 46 on dogs 32. The second set of paddles 46, as can be seen on FIGS. 2 and 3, are aligned on the dogs and seized to have a smaller resistance to water flow than the first set of paddles 52 because the holding ring 42 must slide on sleeve 28 before the second set of paddles 46 can perform their function as will be explained hereinafter. Also shown is the connection 53 of line 16 to opposite sides of locking ring 42.

Figure 5:
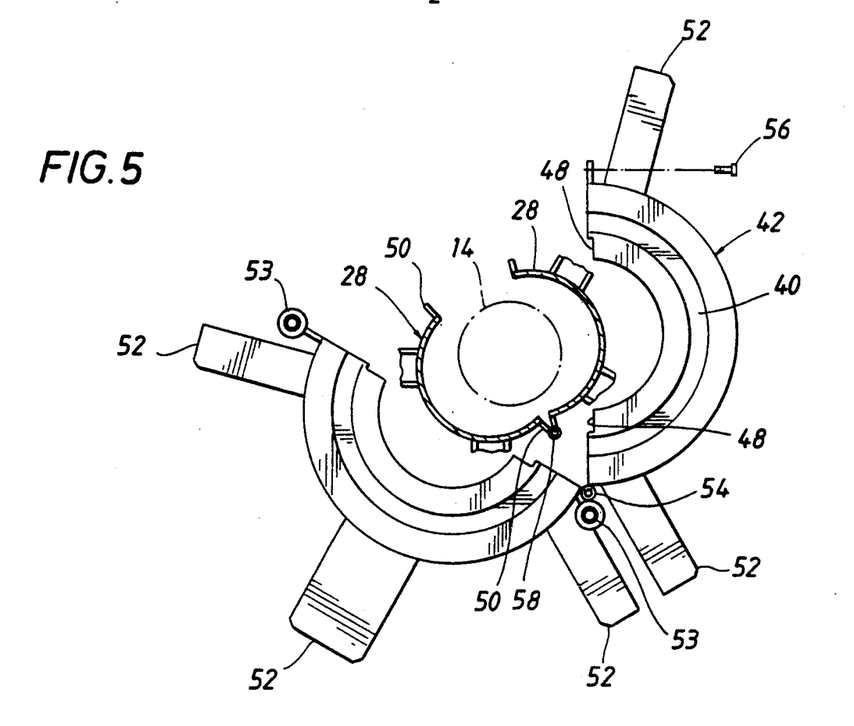
FIG. 5 is a cut away view of the embodiment shown in FIG. 2 looking toward the rear showing the sleeve and the locking ring of the present invention opened to encircle a marine cable.

Referring now to FIG. 5 which shows a cross sectional view of the preferred embodiment of the deployment tool opened to encircle cable 14. Locking ring 42 is shown to be divided into two sections connected by a hinge 54 on one side and a bolt 56 on the other side with the split between the two sections aligning with guide notches 48. In addition, the sleeve 28 is also shown to be divided into two longitudinal sections which are connected by hinge 58. In the preferred embodiment, the split between the two sections is aligned with guide rails 50. In addition, in the preferred embodiment the hinge 58 extends the length of sleeve 28 however localized hinges could be used in other embodiments.

Figure 6:
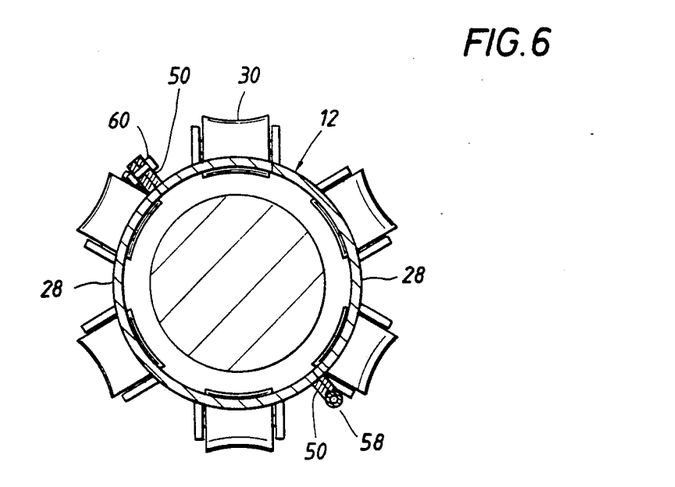
FIG. 6 is a cross sectional view of the embodiment shown in FIG. 2 take at section 6—6 looking toward the rear of the present invention to show the arrangement of components at the rear end.

Referring now to FIG. 6, which shows a cross section at the rear end of deployment tool 12. The two sections of cable deployment tool 12 are shown to be attached by sleeve hinge 58 and a bolt 60 on the opposite side. Referring to FIG. 2, bolt 60 is also used at the front end of the preferred embodiment to close the sleeve 28 around the cable 14. Also shown in FIG. 6 are rollers 30 which are installed on sleeve 28 to reduce friction between sleeve 28 and cable 14. Referring again to FIG. 2, it can be seen that in the preferred embodiment the rollers at each end are connected to sleeve 28 by an extension from sleeve 28. This arrangement on the extension on the sleeve to mount the rollers 30 at rear end of deployment tool 12 also has the dual role of acting as a stop 51 for the locking ring 42. In addition, in the preferred embodiment, the placement of each roller on an extension from sleeve 28 to extend beyond the ends of sleeve 28 provides protection for cable 14. Rough seas or a sudden jerk on the deployment tool 12 could cause the ends of sleeve 28 to cut into cable 14. With the use of rollers in this manner, the cable is not able to contact the ends of deployment tool 12 and the additional length to the cable deployment tool 12 provided by the rollers in this location also helps to reduce kinking of the cable.

A more detailed description of the operation of the preferred embodiment of the present invention is now provided. Returning to FIG. 2, the deployment tool 12 is shown in an engaged position grabbing the cable. The engagement surface 62 of dog 32 is in contact with collar 26. The shape of the engagement surface 26 is not critical as long it is compatible with the engagement surface of collar 26. The dog 32 is shown to be connected to sleeve 28 at pivot point 34 and the dog 32 extends through an opening 64 in sleeve 28 to engage collar 26. Dog 32 also has an extension 66 in contact with the exterior of sleeve 28 which limits the inward movement of dog 32 about pivot 34 so that the engagement surface 62 is properly aligned with the engagement surface of the collar 26 when the deployment tool is placed on cable 14.

After the dogs 32 are properly engaged with collar 26, the locking ring is slid forward so that the locking ring notch 40 engages the locking teeth 38 on dogs 32. Line 16 is then place under tension to hold locking ring 42 in place and also provides a opposing tension force on collar 26 whereby line 16 takes up the longitudinal tension on the length of cable 14 which is trailing behind collar 26. The cable storage reel can then be actuated to deploy a portion cable into the water. As the cable is deployed, line 16 lets out deployment tool 12 in the preferred method to deploy cable such that the deployed portion of cable trails behind the ship in a slack condition, i.e. the portion of cable being deployed is isolated from the longitudinal tension force on the cable trailing behind collar 26.

After the desired portion of cable is deployed, typically around 600 feet of cable, the next collar is available on the marine cable for use in deployment of the cable. The cable storage reel is stopped. Line 16 continues to let out deployment tool 12 until the slack portion of cable assumes the tension of the cable trailing behind collar 26 and line 16 is no longer carrying the longitudinal tension forces on the cable. This can be determined in at least two ways. The first method is to mark line 16 so that the hoist operator can determine the relative position of the deployment tool with respect to the deployed portion of cable. The second method is to place a tension gauge on either/or both the line connected to the deployment tool and the cable storage reel.

Figure 7:
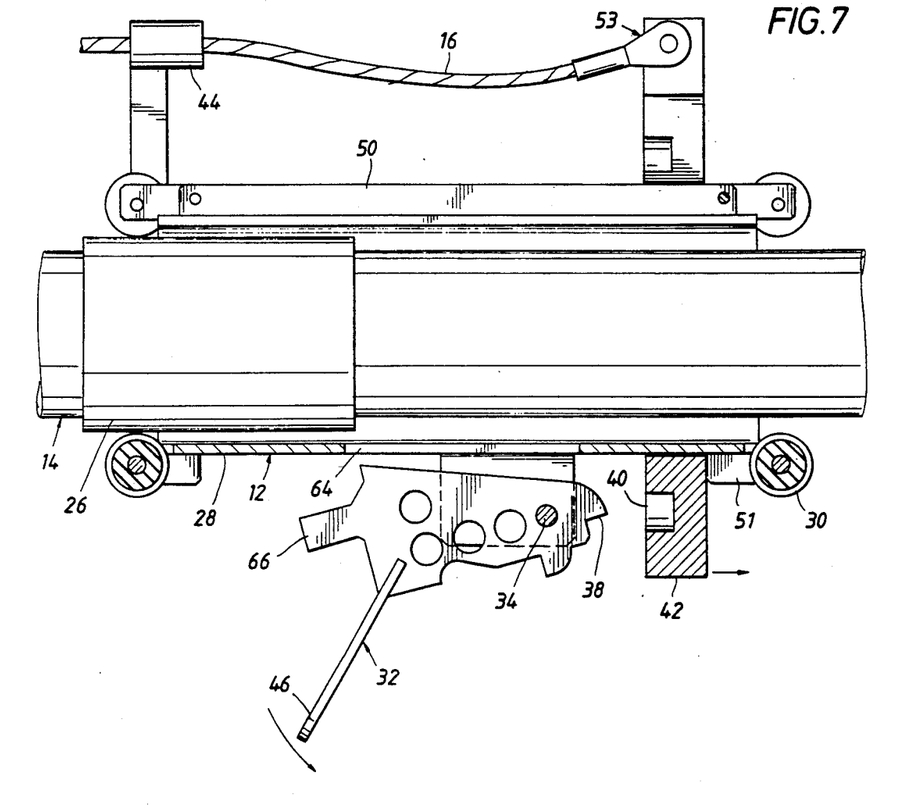
FIG. 7 is the same view as FIG. 2 except the locking ring has moved to show how the preferred embodiment releases from a collar.

Referring now to FIG. 7, which is the same cross section as FIG. 2 of the present invention for a description of a dog releasing means for releasing dogs 32 of the deployment tool 12 from cable 14. The operation of the releasing mechanism to the cable deployment tool will be the same for both the preferred and alternated method of deployment of marine cable. In the preferred embodiment of the present invention, after the deployed portion of cable picks up the longitudinal tension force on the cable, line 16 is released so that no tension is applied to ring 42 by line 16. The cable deployment tool 12 moves away from the ship along the cable due to the drag force of water upon the cable deployment tool. Although the first and second set of paddles on the deployment tool resist the movement of water past the deployment tool, the first set of paddles 52 on the locking ring 42 are aligned with respect to the holding ring and sized to have a greater resistance to water flow than the second set of paddles 46 on the dogs. The greater resistance to water flow of the first set of paddles 52 as compared to the second set of paddles 46 will result in the locking ring 42 sliding to the rear of sleeve 28. This will release the engagement tooth 38 from locking notch 40. When the engagement locking tooth 38 releases from locking notch 40, dog 32 is free to pivot about pivot point 34. The resistance of paddle 46 on the dog to water flow will then provide the force for dog 32 to swing about pivot point 34.

Other dog releasing means for releasing the dogs from the collar may become apparent to those who practice the art such as: Biasing the dogs whereby the slidable holding ring will hold the dogs in an engaged position. Upon the movement of the holding ring to the rear of the sleeve due to the force of water on the first set of paddles, the dogs will spring away from the collar. If this method for a dog releasing means is used, then the second set of paddles on the dogs will not be necessary.

Figure 8:
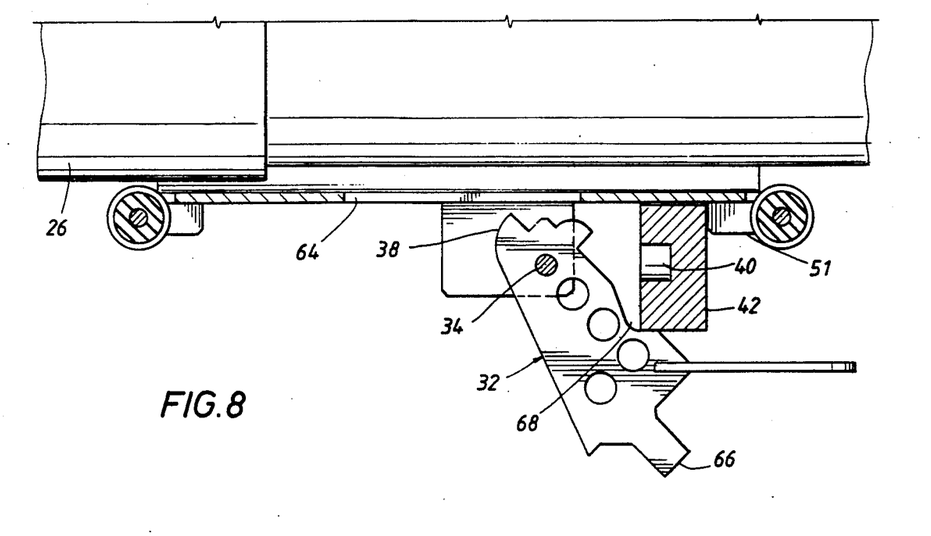
FIG. 8 is a partial view of the same view as FIG. 7 except a dog has rotated to rest against the locking ring.

Referring now to FIG. 8, in the preferred embodiment, locking ring 42 has slid against stop 51 and dog 32 has rotated about pivot point 34 and rests against locking ring 42. Returning to FIG. 3, it can be seen that the paddles 46 on the dogs 32 and the locking ring paddles 52 are aligned with respect to each other such that when the dogs 32 rotate about pivot point 34 the path of rotation of the paddles on the dogs (the second set of paddles) goes between the locking ring paddles (the first set of paddles). In addition since, the guide rails 50 prevent the locking ring 42 from rotating about sleeve 28, the locking ring paddles (first set of paddles) 52 are held in place with respect to the circumference of to sleeve 28 so that they can not interfere with the rotation of dogs 32 though the gaps between the locking ring paddles 52.

Referring again to FIG. 8, the dog 32 has a ring mating surface 68 which is in contact with locking ring 42. The line 16 (not shown in the FIG. 8) is still in a slack condition, i.e. no tension is being placed on locking ring 40 so the deployment tool 12 is moving along cable 14 in a direction away from the ship due to the resistance of the deployment tool to water flow. The resistance on paddle 46 on dog 32 to water flow holds ring mating surface 68 of dog 32 against locking ring 42.

Figure 9:
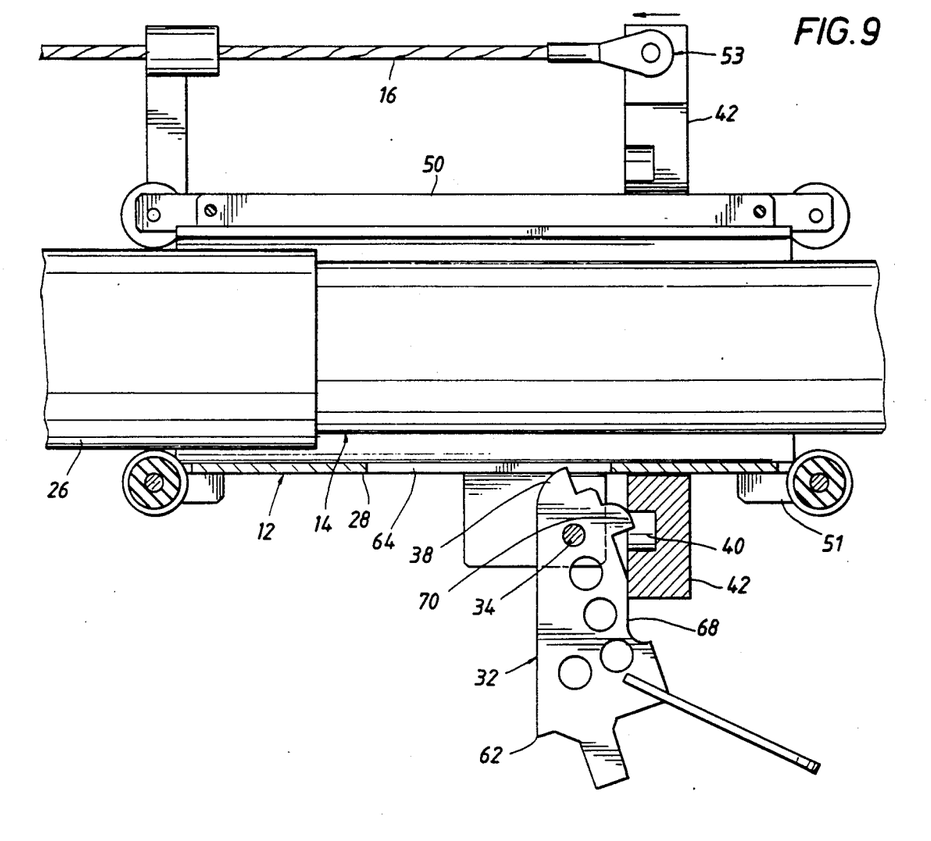
FIG. 9 is the same view as FIG. 7 except the locking ring is moving forward to lock the dog into a retrieval position.

Referring now to FIG. 9, line 16 is now placed under tension to pull the deployment tool back to the ship along cable 14. Since the line is connected to locking ring 42, locking ring 42 slides forward along sleeve 28. Ring mating surface 68 is shaped so that when locking ring 42 slides forward dog 32 will rotate about pivot point 34 so that a retrieval locking tooth 70 on dog 32 engages locking notch 40.

Figure 10:
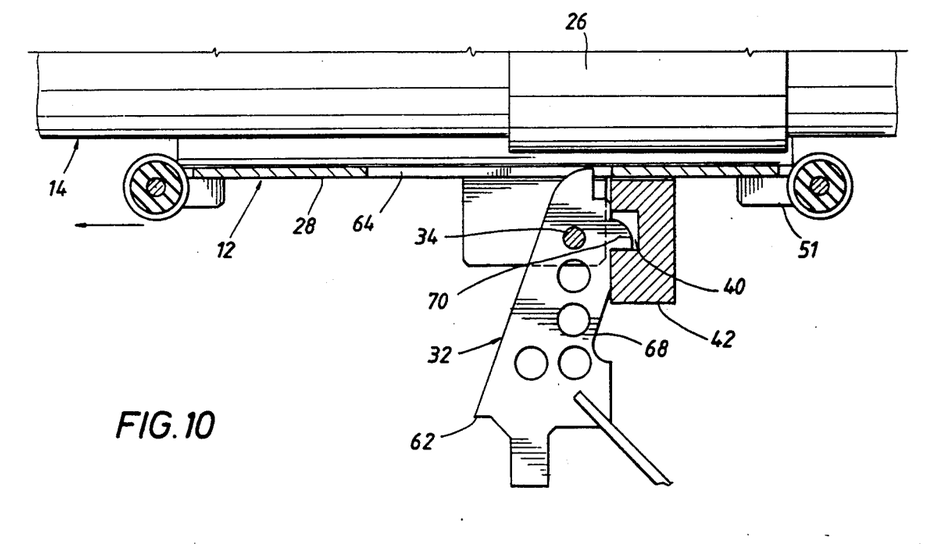
FIG. 10 is a partial view of the same view as FIG. 7 with the embodiment being pulled toward the ship.

Referring now to FIG. 10, locking ring notch 40 is engaged with retrieval locking tooth 70. Since the locking ring 42 can no longer slide forward, tension placed on line 16 (not shown in FIG. 10) now acts to pull deployment tool 12 along cable 14 back to the ship for connection to the next portion of cable to be deployed. The engagement of retrieval locking tooth 10 with locking ring notch 40 prevents dog 32 from rotating about pivot point 34 in such a manner that engagement surface 62 could swing within opening 64 and damage cable 14 as deployment tool 12 is being pulled back to the ship.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A method for deploying marine cable from on board a ship which reduces a longitudinal tension force on the cable at the cable storage reel when the cable storage reel in winding out the cable, comprising the steps of:
   (a) attaching a collar to the cable;
   (b) utilizing a cable deployment tool adjacent to the collar;
   (c) utilizing a line connected between the ship and the cable deployment tool;
   (d) engaging the collar with the cable deployment tool by applying a tension force on the line such that the cable deployment tool exerts an opposing force on the collar to the longitudinal tension force on the collar of the cable trailing behind the collar, whereby between the collar and the cable storage reel a portion of cable is isolated from the longitudinal tension force of the cable trailing behind the collar;
   (e) deploying the isolated portion of the cable from the cable storage reel while maintaining the opposing tension force at the collar;
   (f) preventing kinking of the deployed portion of cable during deployment by using a sleeve which is a part of the cable deployment tool to prevent kinking damage to the cable; and
   (g) releasing the opposing tension force so that the deployed portion of isolated cable is subjected to the longitudinal tension force of the cable trailing behind the collar.

2. An apparatus for the deployment of marine cable from on board a ship which reduces a longitudinal tension force on the cable at the cable storage reel when the cable storage reel is winding out the cable, comprising:
   (a) a collar attached to the cable at a location where the collar is functional to absorb the longitudinal tension force on the cable trailing behind the collar;
   (b) a cable deployment tool having a collar engagement means for engaging the collar whereby the collar engagement means engages the collar;
   (c) a sleeve which is a part of the cable deployment too, the sleeve encircling the cable, whereby the sleeve prevents the cable from damage by kinking of the cable; and
   (d) a line attached between the cable deployment tool and the ship, the line is operative to apply tension on the cable deployment tool such that an opposing force is placed on the collar to oppose the longitudinal tension force of the cable trailing behind the collar whereby the longitudinal tension force on a portion of cable between the cable storage reel and the collar is reduced so that the portion of cable can be deployed from the cable storage reel.

3. The apparatus for the deployment of marine cable according to claim 2 wherein the collar has a diameter greater than the diameter of the cable.

4. The apparatus for the deployment of marine cable according to claim 2 further including:
   (a) a slidable locking ring which comprises at least a part of the collar engagement means, the slidable locking ring encircling the sleeve; and
   (b) a line guide attached to the forward end of the sleeve, wherein the line passes through the line guide and is attached to the slidable locking ring, the line being operative to apply tension to the locking ring, whereby tension is applied to the locking ring for engagement of the collar during deployment of the portion of cable between the collar and the cable storage reel, and after release of the cable deployment tool from the collar, the cable deployment tool is pulled back to the ship by the line.

5. The apparatus for the deployment of marine cable according to claim 4 further including a friction reduction means for reducing friction between the sleeve and the cable when the sleeve is moving along the cable.

6. The apparatus for the deployment of marine cable according to claim 4 further including rollers attached to the sleeve to reduce friction between the sleeve and the cable when the cable deployment tool is moving along the cable.

7. The apparatus for the deployment of marine cable according to claim 4 wherein:
   (a) the cable deployment tool is divided into longitudinal sections which are joined to encircle the cable; and
   (b) the locking ring is divided into sections which are joined together to encircle the sleeve.

8. The apparatus for the deployment of marine cable according to claim 4 wherein:
   (a) the sleeve has guide rails extending from the sleeve; and
   (b) the locking ring has guide notches whereby the guide notches are functional to encompass the guide rails to prevent rotation of the locking ring when the locking ring slides upon the sleeve.

9. The apparatus for the deployment of marine cable according to claim 4 wherein the collar engagement means includes dogs attached to the sleeve at pivot points to engage the collar, the dogs being held in place during engagement by the slidable holding ring.

10. The apparatus for the deployment of marine cable according to claim 9 further including:
    (a) a first set of paddles which are located around the circumference of the locking ring whereby the first set of paddles are functional to resist the flow of water past the locking ring and when tension is removed from the line, the resistance of the first set of paddles to the flow of water causes the locking ring to slide toward the rear of the sleeve; and
    (b) a dog releasing means for releasing the dogs from engagement to the collar when the locking ring slides toward the rear of the sleeve.

11. The apparatus for the deployment of marine cable according to claim 9 wherein:
    (a) each dog has an engagement locking tooth; and
    (b) the locking ring has a locking notch whereby the dogs are held in an engaged position against the collar by inserting each engagement locking tooth into the locking notch and applying tension to the line to keep the locking notch over each engagement locking tooth.

12. The apparatus for the deployment of marine cable according to claim 11 further including:
    (a) a first set of paddles which are located around the circumference of the locking ring, the first set of paddles are seized and aligned to resist the flow of water past the locking ring; and
    (b) a second set of paddles located on the dogs with each dog having a paddle thereon, the second set of paddles are seized and aligned to have a smaller cross sectional area facing the flow of water than the first set of paddles whereby when the tension force of the line is removed from the locking ring the greater resistance to flow of the first set of paddles as compared to the second set of paddles results in the locking ring sliding toward the rear end of the sleeve, the locking notch then disengages from each engagement locking tooth to allow the dogs, due to the resistance of the second set of paddles to water flow, to rotate about their pivot points, thus releasing the dogs from the collar.

13. The apparatus for the deployment of marine cable according to claim 12 further including:
    (a) a guide rails extending from the sleeve;
    (b) a guide notches located on the locking ring, the guide notches are functional to encompass the guide rails to prevent rotation of the locking ring when the locking ring slides upon the sleeve; and
    (c) an alignment between the first set of paddles and the second set of paddles, the alignment is functional to ensure that when the second set of paddles on the dogs rotate about their pivot points, the path of rotation of the second set of paddles on the dogs is between the first set of paddles.

14. The apparatus for the deployment of marine cable according to claim 12 further including:
    (a) a retrieval locking tooth on each dog; and
    (b) a retrieval alignment surface on each dog whereby after the dogs have released the collar and have rotated about the pivot point, the retrieval alignment surface rests against the locking ring, when the locking ring is pulled forward against the retrieval alignment surface, the dog rotates forward to align the retrieval locking tooth within the locking notch thereby holding the dogs in a locked retrieval position while the cable deployment tool is pulled back to the ship.

15. An apparatus for the deployment of marine cable from on board a ship which reduces a longitudinal tension force on the cable at the cable storage reel when the cable storage reel is winding out the cable, comprising:
    (a) a collar attached to the cable at a location where the collar is functional to absorb the longitudinal tension force on the cable trailing behind the collar;
    (b) a cable deployment tool having a sleeve which encircles the cable;
    (c) dogs attached to the sleeve at pivot points which engage the collar;
    (d) a slidable locking ring which encircles the sleeve and holds the dogs in engagement with the collar when under tension;
    (e) a line guide attached to the forward end of the sleeve;
    (f) a line which passes through the line guide and is attached between the locking ring and the ship, the line is operative to apply tension to the locking ring whereby an opposing force is applied to the collar which opposes the longitudinal force on the cable trailing behind the collar thus isolates a portion of cable between the collar and the cable reel so that the isolated portion of cable can be deployed;
    (g) a first set of paddles attached to the locking ring which are functional to resist the flow of water past the locking ring whereby when the locking ring is released from tension the first set of paddles slide the locking ring to rear of the sleeve; and
    (h) a second set of paddles, the second set of paddles include a paddle which is attached to each dog, the second set of paddles are functional to resist the flow of water past the sleeve whereby the locking ring slides to the rear of the sleeve, the dogs are no longer held in place by the locking ring thereby the second set of paddles to release the dogs from the collar.

16. A method for deploying marine cable from on board a ship which reduces a longitudinal tension force on the cable at the cable storage reel when the cable storage reel is winding out the cable into the water, comprising the steps of:
    (a) utilizing a collar attached to the cable at a predetermined location; and
    (b) utilizing a cable deployment tool having a collar engagement means for engaging the collar and a sleeve to prevent damage to the cable by kinking of the cable;
    (c) reducing the longitudinal tension force at the cable storage reel by engaging the collar engagement means with the collar to grip the collar with an opposing tension force to the longitudinal tension force on the cable trailing behind the collar whereby the longitudinal tension force on a portion of cable between the predetermined location and the cable storage reel is reduced;
    (d) deploying the portion of the cable from the cable storage reel while maintaining the opposing tension force at the collar; and
    (e) releasing the opposing tension force so that the deployed portion of cable is subjected to the entire longitudinal tension force of the cable trailing behind the predetermined location.

17. The method for deploying marine cable according to claim 16 wherein:
    step (b) includes attaching a line between the cable deployment tool and the ship to provide the opposing tension force; and
    step (d) includes dispensing the line so that the cable deployment tool allows the deployed portion of cable to trail behind the ship while the cable deployment tool maintains an opposing tension to the cable trailing behind the cable deployment tool.

18. The method for deploying marine cable according to claim 17 also including:
    wherein in step (e) the releasing of the opposing tension force also unlatches the cable deployment tool from the collar; and
    including the step of (f) pulling the line back toward the ship whereby the cable deployment tool returns to the ship along the cable.

19. An apparatus for the deployment of marine cable from on board a ship which reduces a longitudinal tension force on the cable at the cable storage reel when the cable storage reel is winding out the cable, comprising:
    (a) a collar attached to the cable at a location where the collar is functional to absorb the longitudinal tension force on the cable trailing behind the collar;
    (b) a cable deployment tool having a collar engagement means for engaging the collar and a sleeve whereby the collar engagement means engages the collar and the sleeve prevents the cable from kinking; and
    (c) a line attached between the cable deployment tool and the ship, the line being operative to apply tension on the cable deployment tool such that an opposing force is placed on the collar to oppose the longitudinal tension force of the cable trailing behind the collar, whereby the longitudinal tension force on a portion of cable between the cable storage reel and the collar is reduced so that the portion of cable can be deployed from the cable storage reel.

20. A method for deploying marine cable from on board a ship which reduces a longitudinal tension force on the cable at the cable storage reel when the cable storage reel is winding out the cable, comprising the steps of:
   (a) attaching a collar to the cable at a predetermined location, the collar having a diameter greater then the cable;
   (b) gripping the cable at the predetermined location with a cable deployment tool having a collar engagement means for engaging the collar whereby the cable deployment tool working in conjunction with the collar grips the cable;
   (c) opposing the longitudinal tension force on the cable trailing behind the collar by attaching a line between the cable deployment tool and the ship to provide an opposing tension force whereby the longitudinal tension force on a portion of cable between the collar and the cable storage reel is reduced;
   (d) deploying the portion of the cable from the cable storage reel while maintaining the opposing tension force on the collar;
   (e) preventing kinking of the deployed portion of cable during deployment by using a sleeve which is a part of the cable deployment tool to prevent kinking damage to the cable; and
   (f) releasing the opposing tension force so that the deployed portion of cable is subjected to the entire longitudinal tension force of the cable trailing behind the predetermined location.

21. The method for deploying marine cable according to claim 20 wherein step (d) includes dispensing the line so that the cable deployment tool allows the deployed portion of cable to trail behind the ship while the cable deployment tool maintains an opposing tension to the cable trailing behind the cable deployment tool.

22. The method for deploying marine cable according to claim 21 also including the step of:
   (g) pulling the line back toward the ship whereby the cable deployment tool returns to the ship along the cable.

23. The method for deploying marine cable according to claim 22 wherein step (g) includes utilizing a friction reduction means for reducing friction between the sleeve and the cable.

24. The method for deploying marine cable according to claim 22 wherein step (g) includes utilizing rollers to reduce friction between sleeve and the cable.

25. The method for deploying marine cable according to claim 22 wherein step (b) includes:
   utilizing dogs which comprise at least a portion of the collar engagement means by attaching the dogs to the sleeve at pivot points to engage the collar;
   utilizing a slidable locking ring to hold the dogs in place when the dogs are engaging the collar;
   utilizing a line guide at the forward end of the sleeve; and
   attaching the line to the locking ring after running the line through the line guide whereby tension is applied by the line to the holding ring for holding the dogs in place and for providing an opposing force to the longitudinal tension force on the cable trailing behind the cable deployment tool during deployment of the portion of cable between the cable deployment tool and the cable storage reel.

26. The method for deploying marine cable according to claim 25 wherein step (f) includes:
   utilizing a first set of paddles on the locking ring which cause the locking ring to slide back upon the sleeve when the tension on the line is released due to the resistance of the first set of paddles to water flow whereby the locking ring no longer holds the dogs in place; and
   utilizing a second set of paddles on the dogs which cause the dogs to rotate about the pivot point due to the resistance of the second set of paddles to water flow thereby the dogs are released from the collar.

27. The method for deploying marine cable according to claim 26 wherein step (b) includes:
   utilizing an engagement locking tooth on each dog which comprises at least a portion of the collar engagement means;
   utilizing a locking notch on the locking ring which comprises at least a portion of the collar engagement means; and
   engaging the dogs to the collar by inserting the engagement locking tooth of each dog into the locking notch and then applying tension to the locking ring.

28. The method for deploying marine cable according to claim 27 wherein step (g) includes:
   utilizing an retrieval locking tooth on each dog;
   utilizing a ring mating surface on each dog; and
   engaging the retrieval locking tooth to the locking notch on the locking ring by pulling the line back toward the ship whereby the locking ring slides forward against the ring mating surface which causes the dog to rotate forward so that the retrieval locking tooth is inserted into the locking notch thereby holding the dogs in a retrieval position as the cable deployment tool is pulled back to the ship.

* * * * *